E. N. MOOR.
DIVIDING MECHANISM FOR LATHES.
APPLICATION FILED AUG. 30, 1915.
1,200,638.
Patented Oct. 10, 1916.
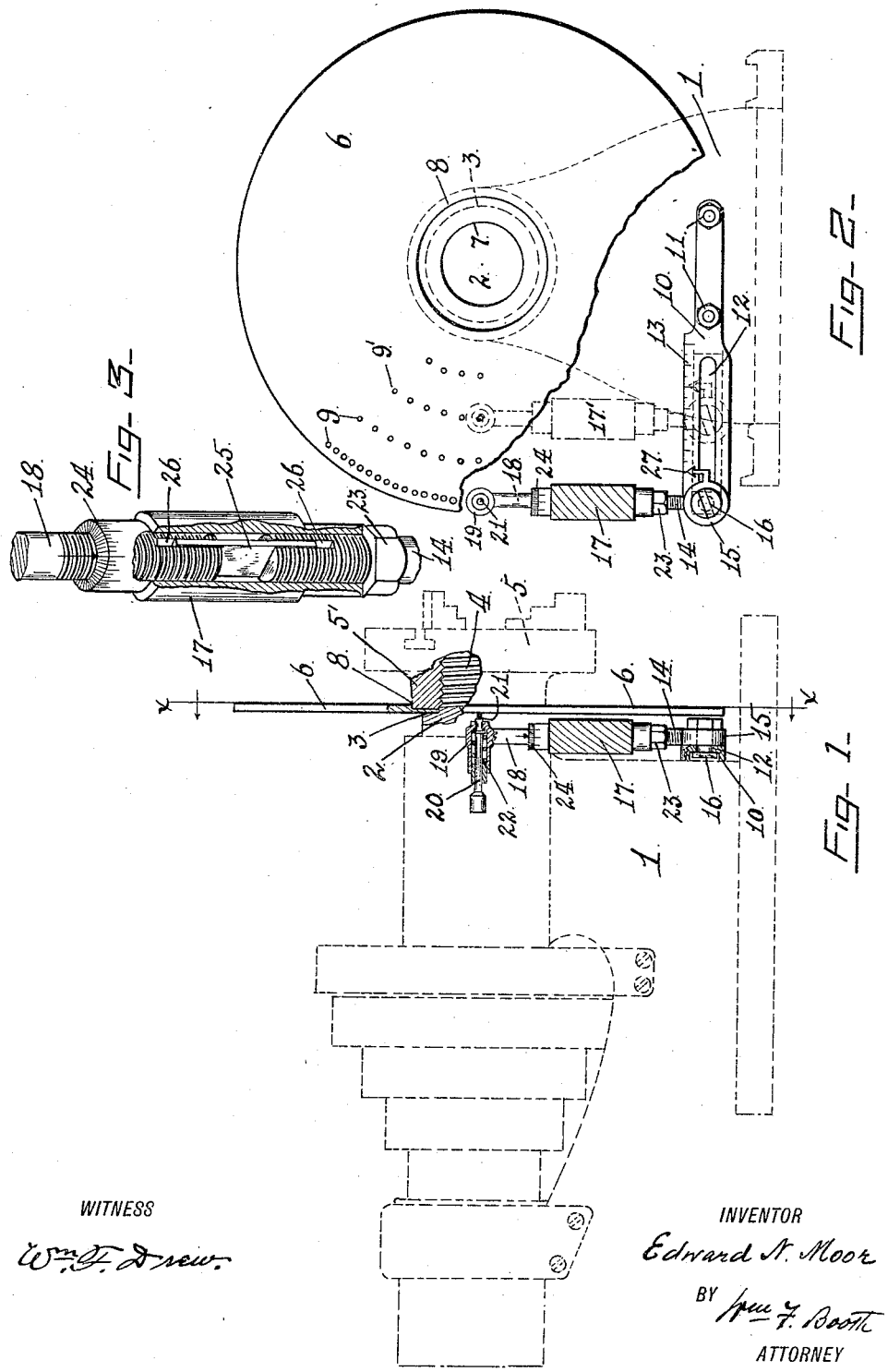
WITNESS
Wm F. Drew.
INVENTOR
Edward N. Moor
BY
Jms F. Booth
ATTORNEY

UNITED STATES PATENT OFFICE.

EDWARD N. MOOR, OF OAKLAND, CALIFORNIA.

DIVIDING MECHANISM FOR LATHES.

1,200,638.  Specification of Letters Patent.  Patented Oct. 10, 1916.

Application filed August 30, 1915. Serial No. 47,984.

*To all whom it may concern:*

Be it known that I, EDWARD N. MOOR, a citizen of the United States, residing at Oakland, in the county of Alameda and State of California, have invented certain new and useful Improvements in Dividing Mechanism for Lathes, of which the following is a specification.

My invention relates to the class of dividing instruments for rotatable tools, and more particularly to a dividing mechanism applicable to lathe spindles, as hereinafter described.

It is sometimes necessary to rotate the spindle of a lathe through a given or measured angle, as, for example, when a milling or grinding attachment is used upon the lathe, and the work is held in the chuck or clamped to the face plate. In such cases, the work is not continuously rotated, as in the usual operations of turning and drilling, but is held stationary while one complete cut is made by the milling or grinding attachment, and then rotated through a given part of a revolution into correct position for the next cut. Examples of such operations are the milling and grinding of gear teeth, fluted reamers, and similar objects. Obviously, the angular distance through which the work is moved after each cut is made must be accurately measured and definitely limited.

The object of my invention, therefore, is to provide a dividing mechanism which may be attached to the spindle of any lathe of the usual type, to enable the same to be accurately and easily manipulated in conjunction with a milling or grinding attachment, and more particularly with the traverse grinding, milling, and drilling machine for lathes, for which United States Letters Patent Nos. 1073698 and 1112716 were granted to me on September 23, 1913, and October 6, 1914, respectively.

To this end my invention consists in the novel device hereinafter described with reference to the accompanying drawings, in which—

Figure 1 is a part-sectional longitudinal elevation of my dividing mechanism applied to the spindle of a lathe. Fig. 2 is a part-sectional transverse elevation of the same, on the line $x-x$ of Fig. 1, certain parts being broken away for clearness. Fig. 3 is a part-sectional detail, enlarged, of the micrometer adjustment of the retaining arm.

In the drawings, the numeral 1 represents the usual head-stock of a horizontal lathe, in which is journaled the spindle 2, formed with the usual shoulder 3 and threaded extension 4 upon which is screwed the chuck 5, or in a similar manner a face-plate, not shown in the drawings.

A division plate 6 is centrally bored at 7 to the same diameter as that of the threaded portion 4 of the spindle 2, and is counterbored at 8, for a portion of its thickness, to receive the hub 5' of the chuck 5, so that said plate is firmly clamped between the shoulder 3 of the spindle 2 and said hub 5' of the chuck. This division plate 6 is preferably made as large in diameter as the swing of the lathe will permit, and is provided with a plurality of annular, concentric rows of holes 9, the holes of each row being spaced by a different angular distance; that is, each row contains a different number of holes.

A horizontal laterally extending bracket 10,—Fig. 2 of the drawings, is fastened to the head-stock 1, as by means of bolts or studs 11, and is provided through a portion of its length with a slot 12, and the portion so slotted is provided with a scale, as shown at 13, the unit of marking being equal to the radial distance between the annular rows of holes 9.

The retaining arm is made as follows:—A threaded shank 14, provided with a head 15, is slidably clamped to the bracket 10 by means of a bolt 16. A sleeve 17 is screwed over the shank 14, and into the upper end of said sleeve 17 is screwed an oppositely threaded shank 18, the whole forming a turn-buckle. Carried by the upper shank 18 is a transverse socket head 19 in which is a slidable pin 20 having a point 21 adapted to engage a hole 9 in the division plate 6, and to be forced thereinto by a spring 22. A lock nut 23 is provided at the lower end of the sleeve 17, the upper end of said sleeve being indexed as shown clearly at 24 in Fig. 3 of the drawings, to provide a micrometer adjustment. A key 25, engaging slots 26 in the adjacent ends of the shanks 14 and 18 within the sleeve 17, holds said shanks in radial alinement. An index pointer 27 on the head 15 of the lower threaded shank 14 locates said head with respect to the index scale 13 on the slotted bracket 10, in such manner that the adjustable retaining arm may be set in a position approximately tangential to any desired row of holes 9 in the division plate 6.

In the operation of the device, if the angular distance through which it is desired to move the spindle be equal to the distance between the holes of any one of the annular rows on the division plate 6, or equal to any multiple thereof, then the work can be located correctly by placing the pin 20 successively in the proper holes, the spindle and the plate 6 being rotated the necessary distance preferably by hand regardless of the position of the retaining arm on the slotted bracket 10. If, however, it is necessary to split the distance between holes, as, for example, if it be desired to move the work through an angular distance equal to half the distance between adjacent holes in any one row, as for instance the row marked 9' in Fig. 2 of the drawings, then the pointer 27 is set to bring the retaining arm into a position tangential to said row of holes 9', as shown in dotted lines at 17', and the first cut on the work is taken with the pin 20 in one of the holes 9'. Then without removing said pin 20 from its hole, the work is rotated the desired amount by means of the turn-buckle and micrometer scale on the retaining arm, and the second cut is made. To bring the work into position for the third cut, the retaining arm is reset to its original length, and the pin 20 is set in the next succeeding hole of the row 9'. These two operations are repeated for the succeeding cuts. It will readily be seen that this cannot be accurately done unless the retaining arm is set tangential to the particular row of holes engaged by the pin 20.

I have described my device as applied to a horizontal lathe. It may, however, be used upon vertical lathes, or upon any other machine of similar type.

I claim:—

1. A dividing mechanism for lathes comprising a division plate to be fixed to the lathe-spindle, said plate having a plurality of annular concentric rows of holes; a lineally extensible retaining arm carrying a pin adapted for engagement with said holes; a fixed bracket extending transversely from the head-stock of the lathe; and a sliding connection between the retaining arm and bracket, to enable said arm to be moved to a plane tangential to any of said rows of holes.

2. A dividing mechanism for lathes comprising a division plate to be fixed to the lathe-spindle, said plate having a plurality of annular concentric rows of holes; a lineally extensible retaining arm carrying a pin adapted for engagement with said holes; a fixed bracket extending transversely from the head-stock of the lathe; a sliding connection between the retaining arm and bracket, to enable said arm to be moved to a plane tangential to any of said rows of holes; and means for lineally extending said arm and locking the same in extended position.

3. A dividing mechanism for lathes comprising a division plate adapted to be clamped upon the lathe-spindle, said plate having a plurality of annular concentric rows of holes; a lineally extensible retaining arm carrying a pin adapted for engagement with said holes; a fixed bracket having a slot extending transversely from the head-stock of the lathe; and means for slidably clamping the retaining arm to the slotted bracket to enable said arm to be moved to a plane tangential to any of said rows of holes.

4. A dividing mechanism for lathes comprising a division plate adapted to be fixed to the lathe spindle, said plate having a plurality of annular concentric rows of holes; a retaining arm comprising alined threaded spindles, a turn-buckle nut to lineally relatively adjust said spindles, and a pin carried in the head of one spindle and adapted to engage the holes of the division plate; and means for securing the other of said spindles to position the arm tangential to any of said rows of holes.

5. In a dividing mechanism for lathes embodying a dividing plate with holes, a retaining arm substantially as described comprising alined threaded spindles, a key slidably mounted in the adjacent ends of the spindles for locking them against relative rotary movement; a turn-buckle nut for relatively adjusting said spindles lineally; means for defining said lineal adjustment in terms of the distance between consecutive holes in the division plate; a pin slidably carried by the head of one spindle for engagement with said holes, and a supporting member carried by the foot of the other spindle.

6. A dividing mechanism for lathes comprising a division plate to be fixed to the lathe-spindle, said plate having a plurality of annular concentric rows of holes; a retaining arm consisting of alined threaded spindles, a turn-buckle nut to lineally relatively adjust said spindles, a pin carried in the head of one spindle and adapted to engage the holes of the division plate, and a clamp member on the foot of the other spindle; a fixed bracket having a slot extending in a plane which traverses the rows of holes in the division plate; and a bolt for slidably clamping the foot member of the retaining arm to the slotted bracket to enable said arm to be moved to a plane tangential to any of said rows of holes.

7. In a dividing mechanism for lathes embodying a dividing plate with holes, a retaining arm substantially as described comprising alined threaded spindles, a key slidably mounted in the adjacent ends of the spindles for locking them against relative rotary movement; a turn-buckle nut for relatively adjusting said spindles lineally; a pin slidably carried by the head of one spindle, and a supporting member carried by the foot of the other spindle.

In testimony whereof I have signed my name to this specification in the presence of two subscribing witnesses.

EDWARD N. MOOR.

Witnesses:
WM. F. BOOTH,
D. B. RICHARDS.

Copies of this patent may be obtained for five cents each, by addressing the "Commissioner of Patents, Washington, D. C."